Figure 1:
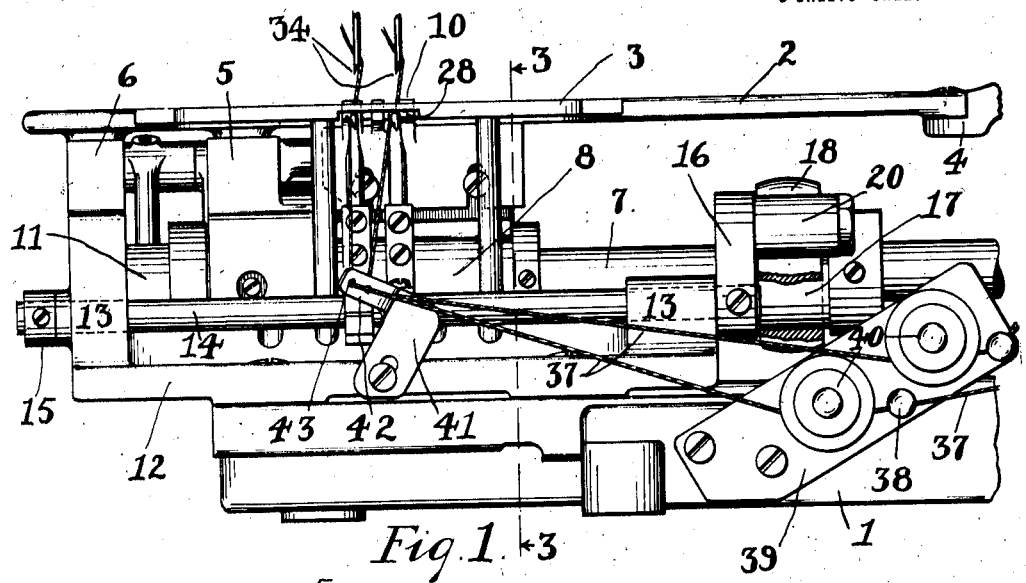

A. H. WEIS.
SEWING MECHANISM.
APPLICATION FILED SEPT. 25, 1918.

1,344,284.

Patented June 22, 1920.
3 SHEETS—SHEET 1.

INVENTOR.
Albert H. Weis
BY
ATTORNEYS.

A. H. WEIS.
SEWING MECHANISM.
APPLICATION FILED SEPT. 25, 1918.

1,344,284.

Patented June 22, 1920.
3 SHEETS—SHEET 2.

INVENTOR.
Albert H. Weis.
BY
ATTORNEYS.

A. H. WEIS.
SEWING MECHANISM.
APPLICATION FILED SEPT. 25, 1918.
1,344,284. Patented June 22, 1920.
3 SHEETS—SHEET 3.
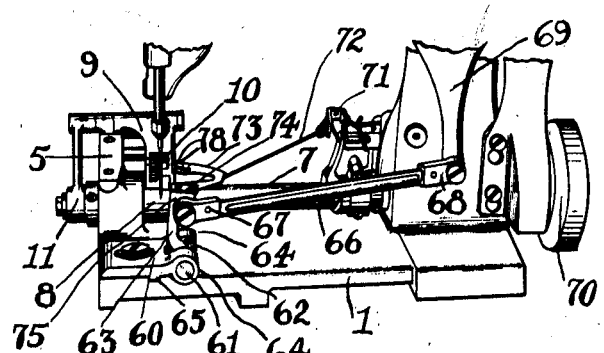
Fig. 14
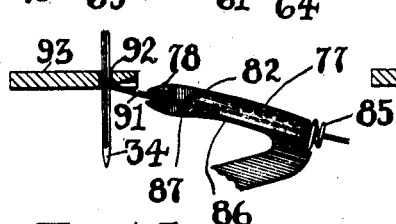
Fig. 15
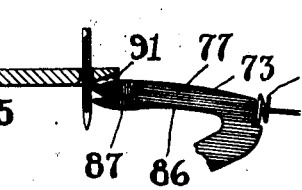
Fig. 16
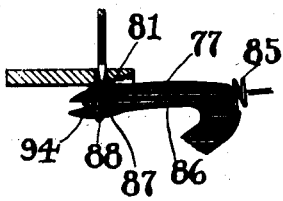
Fig. 17
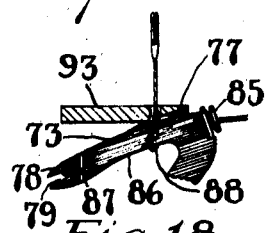
Fig. 18
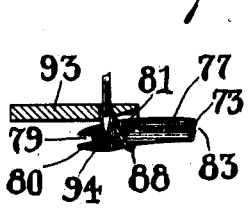
Fig. 19
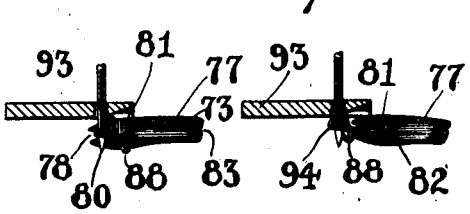
Fig. 20   Fig. 21
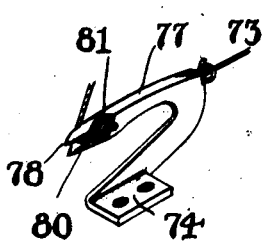
Fig. 23
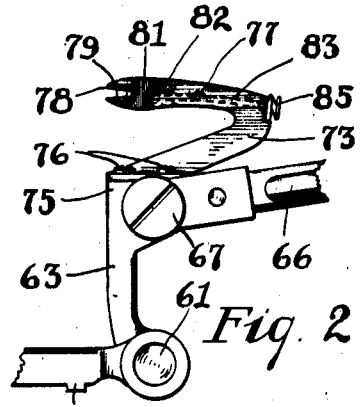
Fig. 22.
Fig. 24.
INVENTOR.
Albert H. Weis.
BY
ATTORNEYS.

UNITED STATES PATENT OFFICE.

ALBERT H. WEIS, OF NYACK, NEW YORK, ASSIGNOR TO METROPOLITAN SEWING MACHINE CORPORATION, A CORPORATION OF DELAWARE.

SEWING MECHANISM.

1,344,284.  Specification of Letters Patent.  Patented June 22, 1920.

Application filed September 25, 1918. Serial No. 255,666.

*To all whom it may concern:*

Be it known that I, ALBERT H. WEIS, a citizen of the United States, residing at Nyack, in the county of Rockland and State of New York, have invented certain new and useful Improvements in Sewing Mechanisms, of which the following is a specification.

This invention relates to an improved sewing mechanism, particularly adapted for making the two-thread chain stitch, the object thereof being to provide an improved sewing mechanism comprising an improved needle and looper mechanism so coöperating that they may operate at high speed to make one or more rows of two-thread chain stitches with the loopers operating in a single plane as distinguished from those which operate in a double plane.

I am aware, however, that attempts have been made to produce looper mechanisms in high speed sewing machines operating in a single plane, but all of these either employ a separate and distinct loop spreader which in a sense is equivalent to the shifting of a looper from one side of the machine to another, or they employ a rotary looper and auxiliary means coöperating therewith, but I believe I am the first to provide a high speed sewing machine having reciprocating loopers arranged to carry threads in a single plane so as to coöperate with the needles and needle threads in the formation of the well known double thread chain stitch, thereby doing away with the transverse movement of the loopers and mechanism heretofore used to shift the loopers from one side of the needle to the other and also doing away with all looper thread take-up means.

The improved loopers and needles shown and described herein, may be substituted in any of the machines now in use and by such substitution a great portion of the operating mechanism can be entirely dispensed with such as loop spreaders and all the parts in connection therewith as well as all the parts used for giving the loopers the so-called needle avoiding movement, that is movement from one side of the needle to the other, and in many instances avoid the use of needle guards because the looper shown in Figs. 14 to 24 inclusive has the needle co- acting with the front wall thereof and by the use of the off-set point needle off-set toward the rear the tendency is to deflect the needle toward the looper and not away from it which is one of the main causes for the skipping of stitches. The looper blade may be carried by any form of looper shank to suit any of the machines now in use.

Among the objects of the invention is the provision of an improved looper mechanism, simple in construction and operation, capable of high speed and of durable construction and which looper mechanism is operative to make the double thread chain stitch without any vibrating means for shifting the loopers from one side of the needle to the other and the loopers of which move in a single plane and are readily convertible to make a single or a double chain stitch and which loopers can be easily threaded and adjusted.

Figure 2:
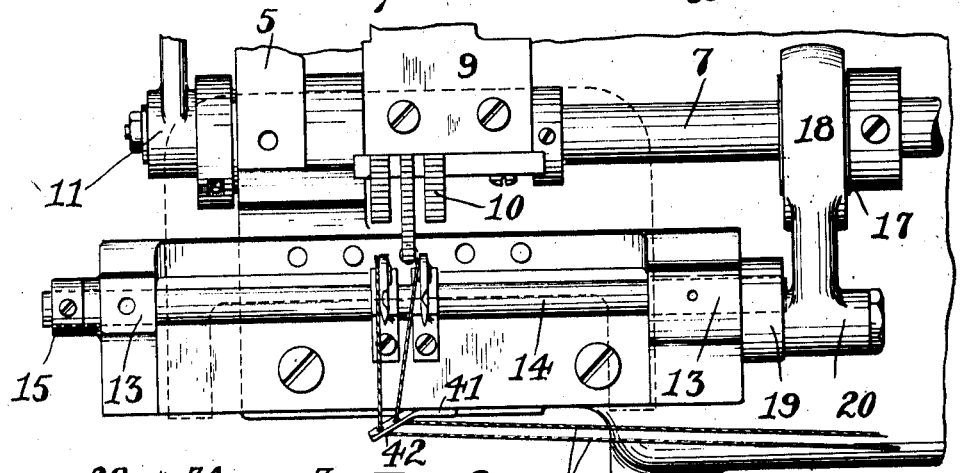
Figure 3:
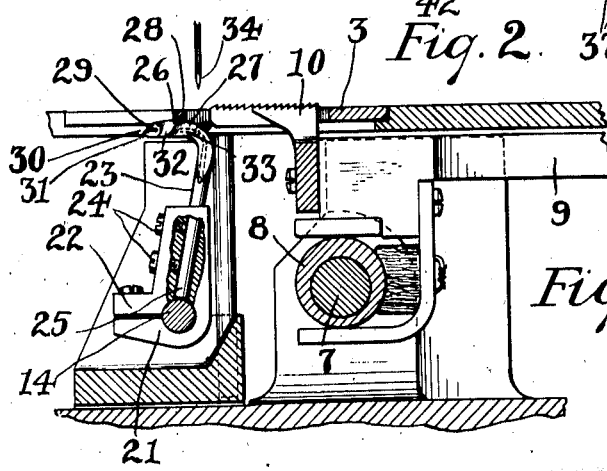
Figure 4:
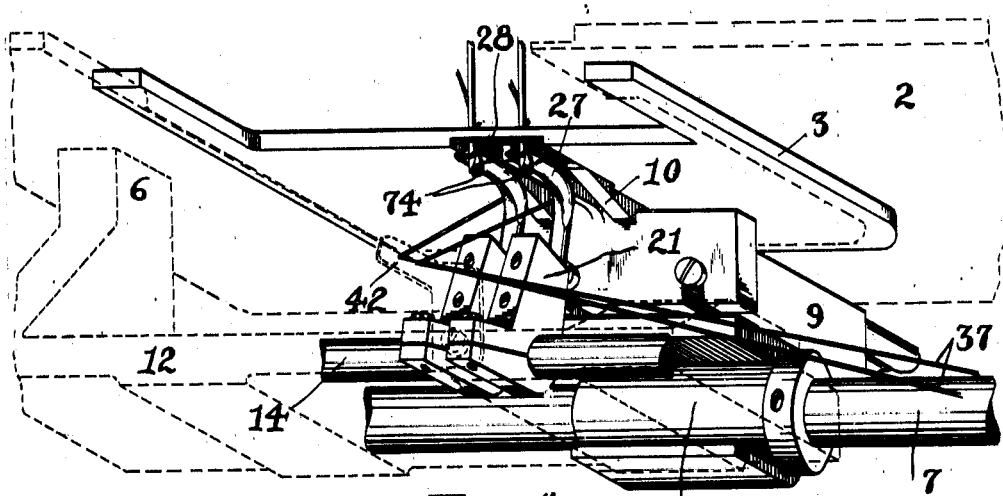
Figure 9:
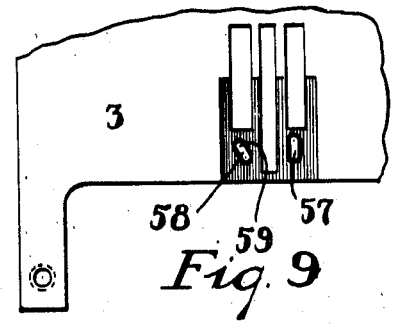
Figures 7, 8:
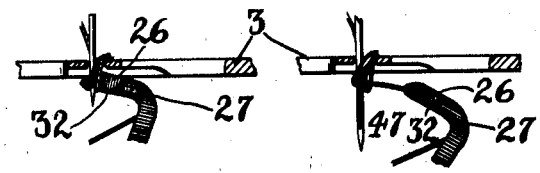
Figures 12, 13:
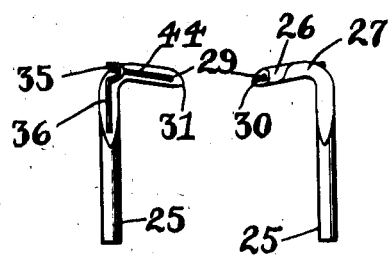
Figures 10, 25:
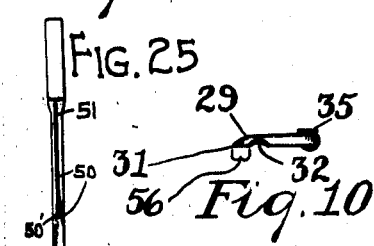
Figure 11:
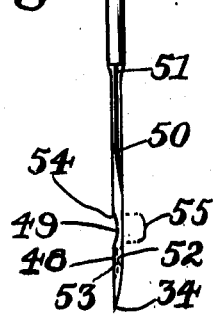

In the drawings accompanying and forming a part of this specification, Figure 1 is a front view showing my improved looper mechanism applied to a Metropolitan sewing machine, the upper portion of the machine being broken away. In this form the loop operates in parallelism with the line of feed. Fig. 2 is a top plan view of Fig. 1, the cloth plate being removed and the throat plate shown in dotted lines; Fig. 3 is a cross sectional view taken on line 3—3 of Fig. 1; Fig. 4 is a perspective view looking up under the throat plate and illustrates how the needles co-act with the loopers, the cloth plate and framework of the machine being shown in dotted lines; Figs. 5, 6, 7 and 8, are detail views showing the needle, throat plate, loopers and the threads and illustrates the different steps in the formation of the stitch; Fig. 9 is a bottom view of the throat plate; Fig. 10 is a top plan view of the looper; Fig. 11 is a side view of the needle, having a special point which is especially useful in connection with my improved looper mechanism; Figs. 12 and 13 are right and left side views of the improved looper used in gang needle machines for making parallel rows of stitching; Fig. 14 is a perspective view of so much of a Metropolitan sewing machine as is necessary to illustrate this improved looper mechanism when operating at right angles to the line of feed; Figs. 15 to 21 inclusive show the throat plate, needle, looper and threads, and the different steps during the formation of the stitches; Fig. 22 is a detail view of the looper carrier and its connections; Fig. 23 is a top plan view of the looper; Fig. 24 is a perspective view of the looper showing how the thread is carried thereby; and Fig. 25 is an enlarged view of the needle showing one of the spiral grooves in dotted lines.

Similar characters of references indicate corresponding parts in the several figures of the drawings.

Figures 5, 6:
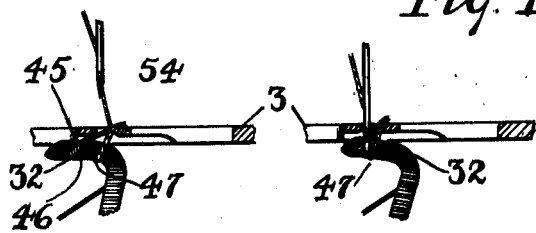

The machine base 1, carries the usual cloth plate 2 provided with the throat plate 3. The cloth plate is supported by the main frame as at 4 at the rear end and at the front end as at 5 and 6. The main shaft 7 operates in the usual bearings and is provided with a feed lift eccentric 8 to give movement to the feed bar 9, carrying the feed dogs 10. End movement is given to the feed mechanism by the usual crank connection 11 carried at the end of the main shaft. The looper mechanism comprises a bracket 12 secured to the base 1 and has bearings 13 in which is mounted a rock shaft 14. Endwise movement of this shaft is prevented by a collar 15 and a crank 16 secured to the shaft ends adjacent to the bearings 13. An eccentric 17 carried by the main shaft 7, operates in a strap connection 18 the other end of which is connected as at 19 to said crank 16 by means of a shoulder screw passing through the bearing 20, of the strap connection and by this means movement is transmitted from the shaft 7 to the rock shaft 14 and its loopers. Secured to the shaft 14 are looper blocks 21 being clamped thereon by suitable screws, and adjustable to and from each other along the shaft between the bearings 13. These blocks carry loopers 23 clamped therein by screws 24. The ends of the looper stems 25 rest upon the shaft 14 while the tops 26 of the looper blades 27 operate underneath and close to the cut-out portion 28 in the throat plate 3. Each looper is provided with a thread carrying eye 29 and a relief groove 30 extending at one side of the looper from the eye toward its needle thread engaging point 31 to prevent the needle cutting off the looper thread in the rapid operation of the machine as the looper thread is thus enabled to sink into such groove. Just back of the eye the looper is rounded or hollowed out to form a recess as at 32 slightly below that is to one side of the plane of the eye and the wall 33 for the entrance of the needle point 34 to pass between a strand of the looper thread and the looper. The opposite side of the looper has a lengthwise extending groove 44 extending rearwardly from the eye. A wire hook 35 is secured as at 36 to the shank of the looper. This hook carries the thread 37 which passes through the eyelet 38 see Fig. 1 as it comes from the supply and these eyelets are carried by a plate 39 secured to the base 1 of the machine. This plate also carries the thread tensions 40 to create a drag on the thread. A thread eyelet carrier 41 is attached to the looper bracket 12 having an angular extension 42 provided with thread eyes 43 to conduct the threads to the wire thread hooks 35 and to the thread grooves 30 and the eyes 29 of the loopers. The location of the eyelet carrier 41 with respect to the loopers is such as to give slack thread to the loopers as they are entering the needle loops while the needles are ascending, and at which time the feed movement of the work takes place, drawing thread from the supply. As the needles descend the loopers move backward away from the eyelet carrier 41 so that the threads 37 are sufficiently taut to hold the strand 45 of the looper thread in position as shown in Fig. 5 so that the needle point 34 will enter between it and the looper as shown in Fig. 6 to complete the stitch in the manner represented by Figs. 7 and 8. The bottom edge 46 of the looper blade 27 is so shaped as to create a back drag on the needle loop 47 which surrounds the looper blade so as to draw it backward with the movement of the looper from the position shown in Fig. 5 to the position shown in Fig. 6 so that the needle point will pass downward in front of the loop, see Fig. 7, and when the looper passes out of the loop it will draw up on the work in the proper manner by the further descent of the needle. It will be observed that as shown in the drawings (see for instance Figs. 5 to 8 and 12 and 13) the hook-shaped looper is a short bladed looper, that is to say, it is very much shorter than the blade of the needle. In practice, it is in fact less than half of the length of the blade of the needle. By reason of the short blade of the looper, it is only necessary to give the looper a comparatively short movement and consequently as less thread is drawn out, it follows that no looper thread take-up or thread handlers are necessary. Therefore, the term "short-bladed" as used herein or in the claims is intended to mean a looper having a blade materially less in length than the blade of the needle. From the drawings it will be observed that I have provided a looper capable of making double thread chain stitches while operating parallel to the line of feed and co-acting with one side of the needle only, it being understood that the looper takes a loop of thread from the needle at one side thereof and gives a loop of looper thread to the needle at the same side without the aid of any spreader, pins, slots or other devices, carried by or independent of the throat plate. To accomplish this result however, I use a special form of needle see Fig. 11 having an offset point which lies in a plane with the outside thread loop forming wall of the needle 48. This improved needle constitutes the subject matter of a contemporaneously pending application of J. P. Weis, filed September 11, 1918, Serial No. 253,535, now Patent No. 1,323,340, dated December 2, 1919.

The needle referred to is a double grooved needle and comprises a shank terminating in a blade, the grooves extending substantially lengthwise of the blade and are spirally formed, and they may be formed like a twist drill is formed, i. e., by cutting the groove straight and then slightly twisting the needle to give the spiral formation to the grooves or they may be formed otherwise if preferred. The needle is provided with a notch 49 and one of the spiral grooves 50 carries the strand of needle thread coming from the supply and extends from the front as at 51 to the eye 52 at the side of the needle. A short groove 53 at the opposite side of the eye is in line with the back portion of this spiral groove for the loop forming strand of the needle thread while the other spirally formed groove 50' extends from the top of the notch 49 to the rear or that side of the needle opposite the groove 50. The needle blade terminates in a point offset from the center line or vertical axis of the needle, and this point lies in the same plane with one of the walls of the needle blade. The notch 49 coöperates with the short bladed looper in the manner herein described. The straight groove 53 of the needle is shown intersecting or crossing the eye 52 of the needle and leads to this notch 49, which notch is for the purpose of permitting the looper point to pass between the needle and the thread to catch the needle loop and also prevents the thread from being pinched off as the needle enters the work.

The disadvantages present in the use of a straight grooved needle having a notch are entirely overcome by the present form of needle. In a straight grooved needle having a notch the thread falls into the notch; in other words, the thread makes a quarter twist from the straight groove around the needle and drops into the notch and causes skipping and breaking of the thread for in making the twist around the needle from the straight groove to the notch it necessarily crosses one of the sharp edges of the groove and this interferes with the drawing up of a tight stitch and frequently causes the breaking of the thread. By providing however, the twist or spiral groove, the twist forms a natural path to accommodate the run of the thread to the notch and by reason of the fact that the bottom of the needle is also grooved as at 53, and as this groove leads directly to the notch 49, it follows that the run of the thread extending from the needle eye bridges over the notch to the groove 50' whereby it is steadied at the time the looper is coacting with the needle, and as the point of the needle is offset in the manner hereinbefore stated, this enables the needle to coact with a looper operating in a single plane to properly get behind the looper thread. If it were not for the notch the thread would lie directly against the body of the needle and the slightest deflection of the needle would cause the skipping of stitches so that the point of the looper would soon be worn away. The thread engaging point 31 of the looper contacts with the needle slightly above the center of the notch 49 where it enters the needle loop. The width of the notch 49 represented by the brace 55 is substantially the same as that portion of the looper represented by the brace 56, see Fig. 10, that is to say, the movement of the looper with respect to the needle is such that the portion 56 of the looper passes through that portion of the needle indicated by the brace 55 that is through the hollow of the notch 49 so that the remainder of the needle from the notch to the point passes through the recess 32 of the looper. In other words, the notch of the double grooved needle and the recess in the side of the looper is each a relatively long notch and recess respectively, the notch of the needle having greater length than the diameter of the coöperating part of the looper and the recess of the looper having greater diameter than the coöperating part of the needle, which permits the machine to be operated at very high speed without interfering with the proper coöperation of these parts. The adjustment of the parts is such as to have the point of the needle 34 rub in the bottom of the recess 32 of the looper while the point of the looper 31 will rub the portion of the needle at about the point above referred to, which is adjacent to the part marked 54, so that instead of having a needle avoiding movement, there is a distinct needle engaging or contacting movement on the up and down stroke of the needle with the in and out stroke of the looper. A positive engagement of the two parts is thus established to overcome the skipping of stitches and by the use of the offset point needle this is accomplished without springing the needle one-half its diameter from the vertical plane of reciprocation as would be the case if a needle having a central point were used under the above condition. By the arrangement as above described high speed accurate stitching is accomplished, and this by simply using an ordinary needle hole 57 see Fig. 9 rounded out on all edges on the bottom of the plate so as not to chafe the needle thread.

Stitching may be accomplished with a needle, however, having a central point in conjunction with my improved looper by having the needle hole placed at an angle to the line of feed as represented by 58 Fig. 9 to cause the threads in the formation of the stitches, to be drawn slightly away from the body of the looper by reason of the feeding thereof over the angular edge 59 of the needle hole. In that case however the needle would rub the looper to a greater extent.

Having set forth the advantages of one form of my invention when used in connection with gang needle machines wherein the loopers operate parallel to the line of feed, I will now describe the other form wherein the looper operates at right angles to the line of feed. In this instance the organization is such that the looper can be used for making a single row of double thread chain stitches or by the use of two needles in conjunction with my improved looper various forms of ornamental stitches can be produced as the looper will coöperate with two or even three needles abreast in the formation of such stitches just as well as the loopers now in use in machines which have a movement around the needle.

In this form of the invention I make use of a stationary looper bracket 60 see Fig. 14 secured to the machine base 1. This bracket carries a rock shaft 61 to which is secured the hub 62 of a looper carrier 63. The end movement of the shaft 61 is prevented by the hubs 64 of the looper bracket. Lateral adjustments are provided by a tongue and groove formation 65 of the looper bracket and machine base. The looper carrier is actuated by a connecting rod 66 connected thereto by a shoulder screw and joint 67 for rocking movement into and out of the needle loops. The other end 68 of the looper rod 66 is actuated by the needle lever 69 in the usual manner and this needle lever is operated by a hand wheel eccentric and connection generally indicated by 70. In this type of machine it is desirable to use a take-up mechanism 71 for controlling the looper thread 72. The looper 73 is provided with a right-angled portion 74 see Figs. 23 and 24 which may be attached to the seat 75 of the looper carrier 63, by screws 76. The looper comprises a blade 77 having a thread engaging end 78 which is notched as at 79 to receive the strand 80 of the looper thread 72. Adjacent to this notch 79 is a hollowed out portion forming a recess 81 see Figs. 23 and 24 similar to the recess 32 of the looper blade 27 Fig. 10 for the entrance of the needle point 34. This form of looper I provide with an eye 82 just back of the hollowed-out portion and a thread groove 83 on the back face of the looper 84 for the passage of the looper thread 72. The looper also carries an open eyelet 85 to guide the thread from the take-up 71 to the groove 83. Contrary to all other loopers operating at right angles to the line of feed I pass the looper thread from the rear to the front wall of the looper through the eye 82 so that the needle in its descent will enter the looper thread loop at the front instead of at the back of the looper. The bottom of the looper blade is relieved or cut away as at 86 to form a bulge as at 87 thereby to create a back drag on the needle loop 88 so as to carry the loop away from the point of the needle when it enters the loop formed by the strand 80 where it spans the hollowed out portion 81 of the looper in its passage from the eye 82 to the bottom of the notch 79 of the looper, see Figs. 19, 20, 21 and 24. On viewing Fig. 23, it will be observed that the bottom jaw 89 of the looper point lies in a plane with the rear wall 84' while the top jaw 90 lies substantially in a plane with the front wall. The object of this is to cause the strand 91 of the looper thread which extends from the needle hole 92 see Fig. 15 of the throat plate 93 to the eye 82 of the looper to be drawn into the notch 79 by the feeding of the work. Such feeding action carries the thread underneath the jaw 90 so that as the looper moves forward to the position shown in Fig. 16, the strand 91 is secured in the notch so that it is carried through the needle loop 88 in loop form represented by 94 in Fig. 17. The movement is continued to the position shown in Fig. 18 while the needle is ascending. On the descent of the needle the looper is moving backward in the opposite direction carrying the needle loop 88 backwardly to the position shown in Fig. 19 where the needle point is entering the loop 94. As the point of the needle is through the loop as shown in Fig. 20, the tension on the needle loop 88 is sufficient to cause it to slip from the looper blade to the position shown in Fig. 21. A further descent of the needle draws the thread up to the goods.

The arrangement of the hollowed-out or recessed portion of the looper with respect to the jaws thereof as well as with respect to the notch and point of the needle is such as to have the same coöperative relation with one another as in the foregoing description in connection with the parallel gang needle loopers, except in the former instance the needle body passes the looper eye as the looper moves backward and forward whereas in the latter instance the needle body does not pass the looper eye since the eye is in the rear of the recess.

I claim as my invention:

1. In a sewing machine, the combination of a vertically movable needle having a relatively long notched portion at one side, a thread carrying hook-shaped looper operating under the work and movable transversely to the needle and having a relatively long recess in its side wall, across the recess of which the looper thread passes and in which recess the needle passes, the looper passing in the notch of the needle, the notch of the needle having greater length than the diameter of the coöperating part of the looper and the recess of the looper having greater diameter than the coöperating part of the needle.

2. In a sewing machine, the combination of a vertically movable double grooved needle, both of said grooves extending substantially throughout the length of the blade of said needle, said needle also having a relatively long notched portion at one side, a thread carrying hook-shaped looper operating under the work and movable transversely to the needle and having a relatively long recess in its side wall across the recess of which the looper thread passes and in which recess the needle passes, the looper passing in the notch of the needle, the notch of the needle having greater length than the diameter of the coöperating part of the looper, and the recess of the looper having greater diameter than the coöperating part of the needle.

3. In a sewing machine, the combination of a needle having a notched portion and a looper having a recessed side wall, the looper passing in the notch of the needle and the needle passing in the recess of the looper, the looper also having a grooved or notched projecting end.

4. In a sewing machine, the combination of a needle having a notched portion and a looper having a recessed side wall, the looper passing in the notch of the needle and the needle passing in the recess of the looper, the looper also having a grooved or notched projecting end, one part of the notch extending subsantially in a plane with one side of the looper and the other part of the notch extending substantially in the plane of the opposite side of the looper.

5. In a sewing machine, the combination of a needle having a notched portion and a looper having a recessed side wall, the looper passing in the notch of the needle and the needle passing in the recess of the looper, the looper also having a grooved or notched projecting end, said looper also having a thread eye and a groove extending therefrom to the rear of the looper for the passage of the thread from the rear to the front of the looper.

6. In a sewing machine, the combination of a needle having a notched portion and a looper having a recessed side wall, the looper passing in the notch of the needle and the needle passing in the recess of the looper, the looper also having a grooved or notched projecting end, said looper also having a thread eye and a groove extending therefrom to the rear of the looper for the passage of the thread from the rear to the front of the looper, said looper also having a thread guide carried at the rear thereof.

7. In a sewing machine, the combination of a double grooved needle, both of said grooves extending throughout substantially the length of the blade of the needle, said needle also having a relatively long notched portion at one side, and a thread carrying looper having a relatively long recess in its side wall, the looper passing in the notch of the needle and the needle passing in the recess of the looper, the notch of the needle having greater length than the diameter of the coöperating part of the looper and the recess of the looper having greater diameter than the coöperating part of the needle whereby the machine may be run at high speed.

8. A looper for a sewing machine having a thread eye and a grooved or notched point, and a recess adjacent to said eye for the passage of the needle whereby the needle will pass in said looper recess at the inside of the looper thread.

9. In a chain stitch sewing machine, the combination of a vertically movable needle and a reciprocating hook-shaped thread carrying looper operating in a single vertical plane transversely to the needle and coacting with one side of the needle only in the formation of a two-thread chain stitch, whereby the looper is operative without a needle-avoiding movement, and means for operating said needle and looper, said needle having an offset point, a notch and a pair of lengthwise extending grooves and said looper having a recess and a lengthwise extending groove, the construction of the needle and looper being such that they properly coöperate in a high speed machine.

10. In a sewing machine, the combination of a double grooved needle, both of said grooves extending throughout substantially the length of the blade of the needle, said needle also having a relatively long notched portion at one side, and a thread carrying looper having a relatively long recess in its side wall, the looper passing in the notch of the needle and the needle passing in the recess of the looper and said looper having a thread guide carried at the rear thereof and also having a groove extending from its eye to the rear of the looper for the passage of the thread from the rear to the front of the looper.

11. In a sewing machine, the combination of an offset pointed double spirally grooved and notched needle, a looper coöperating therewith and having a recess in its side wall, the looper passing in the notch of the needle and the needle passing in the recess of the looper, and means for operating said needle and looper.

12. In a sewing machine, the combination of an offset pointed double spirally grooved and notched needle, a looper coöperating therewith and having a recess in its side wall, the looper passing in the notch of the needle and the needle passing in the recess of the looper, and means for operating said needle and looper the looper in a single plane without the necessity of giving the looper a needle-avoiding movement.

13. In a sewing machine, the combination of a double spirally grooved needle having an offset point and a reciprocatory looper effective to form a double thread chain stitch, and means for operating the looper in a single plane.

14. In a sewing machine, the combination of a needle and a looper effective to form a double thread chain stitch, said needle having an offset point, a notch at one side of its eye, and a pair of lengthwise extending spiral grooves, said looper having a recess in its side wall, an eye at one end thereof and a groove extending lengthwise thereof, means for operating the looper in a single plane, the notch of the needle coöperating with the looper, and the looper recess coöperating with the needle as these instruments respectively pass each other.

15. A hook-shaped looper for a sewing machine having a short blade whereby the necessity of using take-ups is avoided and provided with a thread eye, a transversely extending recess adjacent to said eye, and a groove extending from said eye to the rear of the looper.

16. A hook-shaped looper for a sewing machine having a short blade whereby the necessity of using take-ups is avoided and provided with a thread eye, a transversely extending recess adjacent to said eye, a groove extending from said eye to the rear of the looper, and a thread guide located at the rear of the looper adjacent to the rear end of the groove.

17. A looper for a sewing machine having a notched point, a transversely extending recess in the rear of said notch, a thread eye in the rear of said recess and a lengthwise extending groove extending from said eye to the rear of the looper.

18. A looper for a sewing machine having a notched point, a transversely extending recess in the rear of said notch, a thread eye in the rear of said recess, a lengthwise extending groove extending from said eye to the rear of the looper, and a thread guide at the rear of the looper adjacent to the end of said groove.

19. A looper for a sewing machine having a notched point, the projections of the point forming the notch being offset relatively to each other, a transversely extending recess located in the rear of said notch, a thread eye located in the rear of the recess, and a lengthwise extending groove extending from the eye to the rear of the looper.

20. A looper for a sewing machine having a notched point, the projections of the point forming the notch being offset relatively to each other, a transversely extending recess located in the rear of said notch, a thread eye located in the rear of the recess, a lengthwise extending groove extending from the eye to the rear of the looper, and a thread guide carried at the rear of the looper adjacent to the end of said groove.

21. A looper for a sewing machine having a notched point, the projections of the point forming the notch being offset relatively to each other, a transversely extending recess located in the rear of said notch, a thread eye located in the rear of the recess, and a lengthwise extending groove extending from the eye to the rear of the looper, said looper having a bulge in the rear of the eye.

22. A hooked-shaped looper for a sewing machine comprising a shank and a laterally extending portion having a notch having offset walls, a transversely extending recess in the rear of said notch, a thread eye in the rear of said recess, a bulge adjacent to said eye, a groove extending from the eye to the rear of the looper, and a thread guide carried by the looper at the rear thereof adjacent to said groove.

23. A hooked-shaped looper comprising a shank and a laterally extending portion having an eye and a notched end, a transversely extending recess adjacent to said eye, a lengthwise extending groove extending from the eye to the rear of the looper, and a thread guide carried by the looper at the rear end of said groove.

24. In a sewing machine, the combination of a double grooved needle, both of said grooves extending throughout substantially the length of the blade of said needle, said needle also having a relatively long notched portion at one side and a thread carrying short bladed looper having a relatively long recess in its side wall, the looper passing in the notch of the needle and the needle passing in the recess of the looper, the notch of the needle having greater length than the diameter of the coöperating part of the looper and the recess of the looper having greater diameter than the coöperating part of the needle whereby the machine may be run at high speed.

25. In a chain stitch high speed sewing machine, the combination of a vertically movable needle and a reciprocating hook-shaped short bladed thread carrying looper operating in a single vertical plane transversely to the needle and substantially parallel to the line of feed and co-acting with one side of the needle only in the formation of a two-thread chain stitch whereby the looper is operative without a needle avoiding movement, and means for operating said needle and looper, said needle having an offset point, a notch and a pair of lengthwise extending spiral grooves and said looper also having a short blade provided with a recess and a lengthwise extending groove, the construction of the needle and looper being such that the looper passes in the notch of the needle and the needle passes in the recess of the looper.

26. A looper for a sewing machine having a notched point, a transversely extending recess in the rear of said notch, a thread eye in the rear of said recess, and a lengthwise extending groove extending from said eye to the rear of the looper, and an eye formed needle coöperating with said looper and having a transversely extending notch and one or more lengthwise extending grooves.

27. A looper for a sewing machine having a notched point, a transversely extending recess in the rear of said notch, a thread eye in the rear of said recess, a lengthwise extending groove extending from said eye to the rear of the looper, and a thread guide carried at the rear of the looper adjacent to the end of said groove, and an eye formed needle coöperating with said looper and having a transversely extending notch and one or more lengthwise extending grooves.

28. A looper for a sewing machine having a notched point, the projections of the point forming the notch being offset relatively to each other, a transversely extending recess located in the rear of said notch, a thread eye located in the rear of the recess, and a lengthwise extending groove extending from the eye to the rear of the looper, and an eye formed needle coöperating with said looper and having a transversely extending notch and one or more lengthwise extending grooves.

29. A looper for a sewing machine having a notched point, the projections of the point forming the notch being offset relatively to each other, a transversely extending recess located in the rear of said notch, a thread eye located in the rear of the recess, a lengthwise extending groove extending from the eye to the rear of the looper, and a thread guide carried at the rear of the looper adjacent to the end of said groove.

30. A looper for a sewing machine having a notched point, the projections of the point forming the notch being offset relatively to each other, a transversely extending recess located in the rear of said notch, a thread eye located in the rear of the recess and a lengthwise extending groove extending from the eye to the rear of the looper, said looper having a bulge in the rear of the eye, and an eye formed needle coöperating with said looper and having a transversely extending notch and one or more lengthwise extending grooves.

31. A hook-shaped looper for a sewing machine comprising a shank and a laterally extending portion having a notch having offset walls, a transversely extending recess in the rear of said notch, a thread eye in the rear of said recess, a bulge adjacent to said eye, and a groove extending from the eye to the rear of the looper, and a thread guide carried by the looper at the rear thereof adjacent to said groove.

32. In a sewing machine, the combination of needle mechanism and looper mechanism, the needle mechanism including an eye pointed needle having a notch above the eye, and a pair of spiral grooves leading respectively from the notch and the eye and the looper mechanism including a thread carrying looper having a recess in its side wall, the looper passing in the notch of the needle and the needle passing in the recess of the looper, and means for operating said looper and needle mechanism.

33. The combination of needle and looper mechanisms, the needle mechanism including an eye pointed needle having an offset point, a notch above the eye, and a pair of spiral grooves leading upwardly respectively from the notch and the eye and the looper mechanism including a thread carrying hook shaped looper having a recess in its side wall, the looper passing in the notch of the needle and the needle passing in the recess of the looper, and means for operating said looper and needle mechanisms.

34. The combination of needle and looper mechanisms, the needle mechanism including an eye pointed needle having an offset point, a notch adjacent to the eye of the needle and a spirally formed groove leading upwardly from the eye of the needle, and the looper mechanism including a thread carrying looper, the blade thereof carrying a thread eye, and a thread groove extending from the eye to the rear of the blade, said looper having a recess in its side wall, the looper passing in the notch of the needle and the needle passing in the recess of the looper, and means for operating said looper and needle mechanisms.

Signed at Nyack, county of Rockland, and State of New York, this 20th day of Sept., 1918.

ALBERT H. WEIS.